United States Patent Office 3,346,827
Patented Oct. 10, 1967

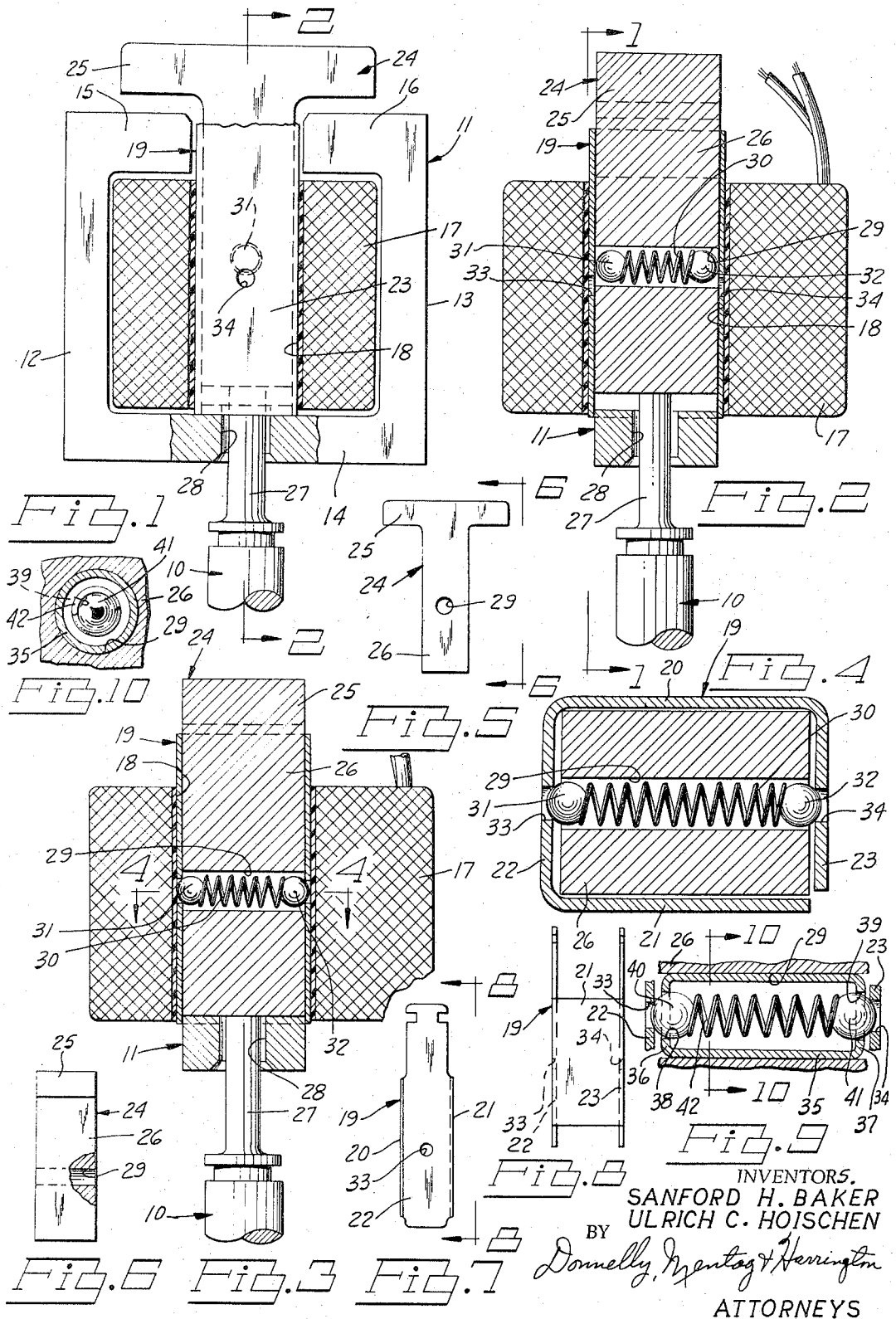

3,346,827
SOLENOID WITH DETENT MEANS
Sanford H. Baker, Oak Park, and Ulrich C. Hoischen, Detroit, Mich., assignors to MAC Valves, Inc., Detroit, Mich., a corporation of Michigan
Filed Oct. 4, 1965, Ser. No. 492,816
1 Claim. (Cl. 335—253)

ABSTRACT OF THE DISCLOSURE

The disclosure herein relates to a solenoid with detent means for holding a valve or the like in a shifted position.

---

There are various types of double solenoid operated valves on the market for controlling the flow of fluids, such as air, in which a valve member such as a valve spool or a pilot spool is shifted between two positions by means of a pair of solenoids. One solenoid is used to shift the valve member in ne direction from a first position to a second position, and the other solenoid is used to shift the valve member in one direction from a first position to the first position. In the operation of such prior art double solenoid operated valves a problem occurs in many instances when one solenoid is used to shift the valve member from a first position to a second position and the solenoid is de-energized. Theoretically, the valve member will stay in the shifted or second position until the other solenoid is energized to shift the valve member back to the first position. However, it has been found that when both solenoids are de-energized and the valve is used in conditions where it is subject to vibrations, then under such conditions it is possible for the valve member to shift out of said second or shifted position by itself due to said vibrations.

In view of the foregoing, it is an important object of the present invention to provide a novel and improved solenoid which is adapted to overcome the aforementioned problem encountered by the prior art double solenoid operated values.

It is another object of the present invention to provide a novel and improved solenoid which is constructed with a detent means adapted to releasably lock the movable armature plunger of the solenoid in a shifted position.

It is a further object of the present invention to provide a novel and improved solenoid in which is incorporated a detent means for holding the solenoid plunger in a shifted position and which is adapted to be used on any double solenoid operated valve without the necessity of providing special valve body structural attachments and without the necessity of making any structural changes in the internal structure of the valve such as changes in the valve spool, valve body, or the like.

It is still another object of the present invention to provide a novel and improved solenoid for use in a double solenoid operated valve and which is provided with a detent means that eliminates the need for holding the valve in a shifted position with an electrical signal.

It is still a further object of the present invention to provide a novel and improved solenoid which is constructed with a detent means adapted to function or engage when the solenoid plunger is on seat, whereby the detent means will work on any application regardless of the length of stroke of the solenoid.

It is still another object of the present invention to provide a novel and improved solenoid which is constructed and arranged with a detent means and which is adapted to be used with a valve body in a combined solenoid and valve body assembly that can be used on a single or double solenoid valve by inserting or removing the detent means as required.

It is still another object of the present invention to provide a novel and improved solenoid which is provided with a detent means for releasably holding a movable solenoid plunger in a shifted position, and which is simple and compact in construction, economical to manufacture, and efficient in operation.

It is still a further object of the present invention to provide a novel and improved solenoid which includes a solenoid coil, a core guide disposed in the solenoid coil, a plunger slidably mounted in said core guide, and a releasable holding means for releasably locking the plunger in a shifted position in said core guide.

Other objects features and advantages of this invention will be apparent from the following detailed description, appended claim, and the accompanying drawing.

In the drawing:

FIG. 1 is an elevational view, with parts broken away, of a solenoid made in accordance with the principles of the present invention;

FIG. 2 is an elevational section view of the structure illustrated in FIG. 1, taken along the line 2—2 thereof and looking in the direction of the arrows;

FIG. 3 is a view similar to FIG. 2 and showing the plunger shifted to a second position and releasably locked in said second position by a detent means;

FIG. 4 is a partial, enlarged, horizontal section view of the structure illustrated in FIG. 3, taken along the line 4—4 thereof, and looking in the direction of the arrows;

FIG. 5 is a reduced elevational view of the armature plunger used in the structure of FIGS. 1 through 4;

FIG. 6 is a right side elevational view of the structure illustrated in FIG. 5, with a portion broken away, taken along the line 6—6 thereof, and looking in the direction of the arrows;

FIG. 7 is a reduced, elevational view of the core guide member employed in the solenoid shown in FIGS. 1 through 4;

FIG. 8 is a right side elevational view of the structure illustrated in FIG. 7, taken along the line 8—8 thereof, and looking in the direction of the arrows;

FIG. 9 is a fragmentary section view, similar to FIG. 4, of a modified detent means made in accordance with the principles of the invention; and, FIG. 10 is an elevational section view of the detent means illustrated in FIG. 9, taken along the line 10—10 thereof, and looking in the direction of the arrows.

Referring now to the drawings, and in particular to FIGS. 1 and 2, the numeral 10 generally designates a valve member in a double solenoid operated valve which is adapted to be shifted between two positions by means of a pair of solenoids made in accordance with the principles of the present invention. An illustrative double solenoid operated valve of the type which may be operated by the solenoid of the present invention is shown in FIG. 17 of U.S. Patent 3,089,517. It will be understood that the valve member 10 may be a valve spool, a pilot spool, and the like.

The embodiment illustrated in FIGS. 1 and 2 comprises the usual C-shaped frame, generally indicated by the numeral 11, which includes the spaced apart longitudinal side members 12 and 13, the integral interconnecting transverse inner end member 14, and the inwardly extended, spaced apart, outer transverse end portions 15 and 16. A coil 17 is operatively mounted within the C-frame 11 in the usual manner. The coil 17 is provided with the axial hole 18.

As shown in FIGS. 1 and 2, a core guide, generally indicated by the numeral 19 in FIGS. 7 and 8, is adapted to be mounted in the coil hole 18 by any suitable means. The illustrated core guide is rectangular in cross section and is shown in FIG. 4 as being open on the ends and provided with the spaced apart side walls 20 and 21 and the integral spaced apart end walls 22 and 23.

As shown in FIGS. 5 and 6, the solenoid includes a T-shaped armature plunger or core which is generally indicated by the numeral 24. The plunger 24 includes the transverse head 25 and the integral elongated body 26 which is rectangular in cross section and adapted to be slidably received in the core guide 19. FIGS. 1 and 2 illustrate the plunger 24 disposed in the core guide 19 and in operative engagement with the reduced end or extension 27 of the valve member 10. The reduced extension 27 of the valve member is slidably mounted through the hole 28 formed through the transverse portion 14 of the C-shaped frame 11.

The illustrative solenoid is provided with a releasable holding means, which is illustrated as a detent means, for holding the plunger 24 in a shifted position in the core guide 19, as described more fully hereinafter. As best seen in FIG. 4, the plunger body 26 is provided with a transverse bore 29 in which is operatively mounted a coiled compression spring 30. A detent member comprising a ball 31 is movably mounted in one end of the bore 29 and engages one end of the spring 30. A second detent member comprising a ball 32 is movably mounted in the other end of the bore 29 and engages the other end of the spring 30. It will be seen that the compression spring 30 normally biases the detent balls 31 and 32 outwardly into engagement with the inner surface of the core guide end walls 22 and 23, respectively. FIGS. 3 and 4 show the plunger body 26 moved to a shifted or on seat position in which the detent balls 31 and 32 are moved laterally into releasable locking engagement with the recesses or holes 33 and 34, respectively.

In use, a solenoid made in accordance with the principles of the present invention would be mounted in operative engagement with each end of the valve member 10. When the valve member 10 is in the position shown in FIG. 2 and the illustrated solenoid is de-energized, the plunger 24 would be in what may be termed a "first" position. When the solenoid of FIG. 2 is energized, the plunger 24 will be moved inwardly in the usual manner to the "second" or shifted position shown in FIG. 3. In the shifted position shown in FIG. 3, the plunger 24 is on seat and the detent balls 31 and 32 will be moved laterally outward into releasable locking engagement with the holes 33 and 34 by the action of spring 30 in a fast and efficient manner. When the plunger body 26 comes down into the position shown in FIG. 3, the detent balls 31 and 32 snap outwardly into the holes 33 and 34, and by governing the relationship of the detent balls to the holes 33 and 34 and the compression load on the spring 30, the detenting forces or releasable holding forces can be regulated, as desired. If the solenoid is de-energized the detent means will hold the valve member 10 in the shifted position regardless of the vibrations to which the valve may be subjected. The detent means releasably holds the valve plunger 24 in the shifted position until the solenoid operating on the other end of the valve member 10 is energized. The detent means will release the plunger 24 and permit it to be moved to the first position shown in FIG. 2 when the last mentioned solenoid is energized.

It will be understood that the detent balls 31 and 32 and the compression spring 30 may be removed from the solenoid plunger 24 to permit use of the solenoid in a valve which may employ a solenoid for shifting the valve in one direction and a spring for returning the valve in the other direction. It will be seen that the novel solenoid of the present invention provides a means for releasably holding a valve member in a shifted position without the necessity of changing the valve structure, either in the valve body or valve spool, to provide a valve holding means. The solenoid of the present invention provides a solenoid incorporating a detent means which is simple and compact in construction, effective in operation, and inexpensive to manufacture.

It will be understood that the compression spring 30 could be some other device, as for example, a compressible resilient material, such as rubber or the like. The detent balls 31 and 32 may also take a form other than a ball and still operate with the spring 30 or some other biasing means for moving the detent members outwardly into operative engagement with the recesses 33 and 34. The detent balls 31 and 32 always engage the recesses 33 and 34, respectively, when the plunger 24 is on seat. Accordingly, the detent means will work on any application regardless of the stroke of the solenoid. The same solenoid structure and valve body assembly can be used on single or double solenoid valves simply by inserting or removing the detent balls 31 and 32 and the spring 30, as required.

FIGS. 9 and 10 illustrate a modification of the invention wherein the detent means is arranged in cartridge form so that it may be quickly and easily removed as a unit when it is desirable to convert the solenoid for use in a single solenoid valve. The self-contained cartridge type detent means of FIGS. 9 and 10 includes the elongated cylindrical container 35 which is adapted to be slidably mounted in the bore 29 formed in the solenoid plunger portion 26. The ends of the container 35 are enclosed by the end walls 36 and 37 through which are formed the aligned axially disposed holes 38 and 39, respectively. A compression spring 42 is mounted in the container 35 and normally biases the detent balls 40 and 41 laterally outward so that a portion of these balls extends beyond the container end walls 36 and 37. As shown in FIG. 9, the detent balls 40 and 41 are adapted to engage the holes 33 and 34 formed in the core guide walls 22 and 23, respectively when the plunger 24 is on seat. The detent means of FIGS. 9 and 10 would operate in the same manner as the first described embodiment of FIGS. 1 through 8. However, it will be seen that the self-contained cartridge type detent means of FIGS. 9 and 10 may be inserted or removed as a unit or assembly in a fast and efficient manner.

While it will be apparent that the preferred embodiment of the invention herein disclosed is well calculated to fulfill the objects above stated, it will be appreciated that the invention is susceptible to modification, variation and change without departing from the proper scope or fair meaning or the subjoined claim.

What we claim is:

In a solenoid, the combination comprising:
(a) a C-shaped solenoid coil frame having spaced-apart side members and a transverse inner end member provided with an opening through which is received an operating member for an apparatus to be operated by the solenoid and outer spaced-apart end portions directed toward each other;
(b) a solenoid coil disposed in said solenoid frame and having an axial hole with a rectangular cross-section aligned with the opening in the frame transverse inner end member;
(c) an open ended tubular core guide having a four-walled rectangular cross-section mounted in said solenoid coil, and at least one of the four walls of the core guide having a hole therethrough;
(d) a solenoid plunger of generally T-formation with a cross head outwardly of the solenoid coil frame and having an elongated leg portion of rectangular cross-section mounted in said core guide with its inner end contacting said operating member, and said plunger being shiftable axially from a first position to a second position when said solenoid coil is energized;
(e) said plunger being provided with a transverse hole which is aligned with the hole in the core guide when the plunger is in said second position;

(f) releasable detent means in the plunger transverse hole engageable with said hole in the core guide when the plunger is shifted to said second position to releasably lock the plunger in said second position;
(g) said detent means including at least one detent member; and
(h) a spring means for biasing said detent member into releasable locking engagement with said hole in the core guide when the plunger is shifted to said second position.

References Cited

UNITED STATES PATENTS

| 2,057,380 | 10/1936 | Keefe. | |
|---|---|---|---|
| 3,235,777 | 2/1966 | Hatashita | 335—254 |
| 3,307,131 | 2/1967 | Hook et al. | 335—253 |

FOREIGN PATENTS 844,337   8/1960   Great Britain.

BERNARD A. GILHEANY, *Primary Examiner.*
G. HARRIS, *Assistant Examiner.*